United States Patent Office 3,452,003
Patented June 24, 1969

3,452,003
PROCESS FOR THE PREPARATION OF 5α-BROMO-6β-HYDROXY STEROIDS
Otto Halpern, Palo Alto, Calif., assignor to Syntex Corporation, Panama, Panama, a corporation of Panama
No Drawing. Filed Apr. 25, 1966, Ser. No. 544,678
Int. Cl. C07c *167/28, 167/26*
U.S. Cl. 260—239.55                20 Claims

ABSTRACT OF THE DISCLOSURE

Process for the preparation of 5α-bromo-6β-hydroxy steroids comprising reacting of a Δ⁵-steroid with a positive bromine or chlorine releasing agent in a carboxylic acid reaction medium followed by treatment with a base to obtain a 5β,6β-oxido steroid which is treated with dry hydrogen bromide to afford the 5α-bromo-6β-hydroxy steroid.

---

This invention relates to the preparation of cyclopentano-phenanthrene derivatives.

More particularly, the present invention relates to the novel preparation of 5α-bromo-6β-hydroxy steroids and intermediates therefor.

The 5α-bromo-6β-hydroxy steroids prepared by the present invention are valuable intermediates for the preparation of important pharmacological compounds such as the 19-nor-steroids. The 5α-bromo-6β-hydroxy steroids prepared by the present invention can be transformed into valuable 19-nor-steroids by known methods, see for example U.S. Patents 3,033,862, 3,206,460 and 3,235,574.

Heretofore, 5α-bromo-6β-hydroxy steroids have been prepared by reacting a Δ⁵-steroid with hypobromus acid or a hypobromus acid providing agent in the presence of a strong inorganic acid catalyst such as perchloric acid, sulfuric acid, and the like in an aqueous organic solvent medium such as aqueous tetrahydrofuran, acetone, dioxane, aliphatic ethers, ethyl acetate, tertiary alcohols, and the like. The prior art methods have proved to be difficult to manipulate or operate and to result in a product containing considerable and difficult to remove side products. Further, the prior art methods have proved to result in a low yield of pure 5α-bromo-6β-hydroxy steroid, i.e. about sixty to sixty five percent.

A primary object of the present invention is to provide a process for the preparation of 5α-bromo-6β-hydroxy steroids and intermediates therefor which overcomes the aforementioned disadvantages. Another object of the present invention is to provide a process for the preparation of 5α-bromo-6β-hydroxy steriods which may be operated at room temperature, is easy to manipulate or operate, produces a high yield of the desired 5α-bromo-6β-hydroxy steroid, and causes a minimum of side products. Another object of the present invention is to provide a process for the preparation of 5α-bromo-6β-hydroxy steroids and intermediates therefor, particularly the 5α-halo-6β-acyloxy intermediate, wherein the mother liquors of the reaction are treated to regenerate the starting compound for recycling in the process. Other objects of the invention will become apparent as the invention is hereinafter described in detail and from the appended claims.

In accordance with the present invention, 5α-bromo-6β-hydroxy steroids are prepared by a process which may be diagrammatically illustrated as follows showing only the applicable A and B rings of the steriod nucleus.

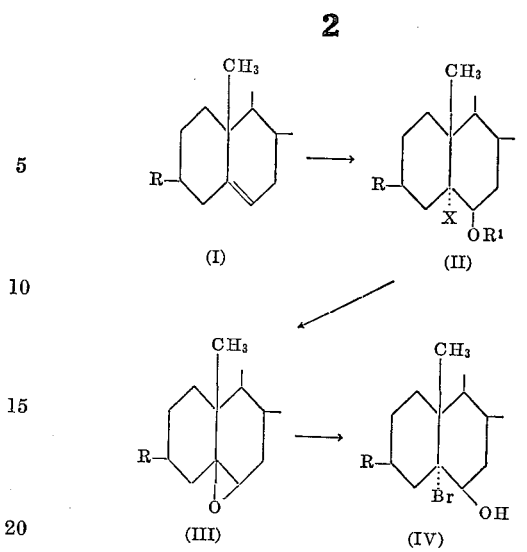

In the above partial formulas, X represents chlorine or bromine, R represents, for example, hydrogen, halogen such as chlorine, hydroxy or an acyloxy group containing less than 12 carbon atoms, preferably an acyloxy group and R¹ represents an acyl group containing less than 12 carbon atoms. Typical ester groups include acetate, propionate, formate, butyrate, benzoate, cyclopentylpropionate, etc. When an ester group is present at position-3, it may be the same or different than the ester group at position-6 (II; R¹=acyl).

In practicing the novel process outlined above the first step is the reaction of the starting material I, a Δ⁵- steroid, with from 1 to 10 molar equivalents, preferably about 1 to 3 molar equivalents, of a positive bromine or chlorine releasing agent in a hydrocarbon carboxylic acid reaction medium. The reaction may be conducted at a temperature within the range of about 10° C. or somewhat lower to about 40° C. or higher, preferably room temperature (about 20–25° C.) for about 15 minutes to about two hours or more. Higher temperatures may be used but there is generally no advantage in doing so. Generally, higher temperatures should be avoided to minimize the possible formation of undesirable side products. The most desirable temperature and reaction time are easily determinable through routine experimentation by one of ordinary skill in the art giving due consideration to the particular Δ⁵-steroid employed as the starting material and the concentration of reagents. This reaction results in a yield of about 80% to 90% of the desired 5α-halo-6β-acyloxy steroid (II) which is easily recovered or separated from the reaction mixture.

The side products formed during the foregoing reaction which comprise primarily the corresponding 5α,6β-dibromo or 5α,6β-dichloro steroid and the 5α-acyloxy-6β-bromo or -chloro steroid are easily converted back to the original starting compound, that is, the Δ⁵-steroid by treatment with zinc in the presence of a lower hydrocarbon carboxylic acid such as acetic, propionic, formic, butyric, and the like, preferably acetic acid. This regeneration of the Δ⁵-steroid starting material is advantageously accomplished by adding finely divided zinc powder and a carboxylic acid, e.g., acetic acid, to the mother liquors obtained from the reaction described in the preceding paragraph. In this manner, up to about 13% of the original Δ⁵ starting material is recovered for recycling which effectively increases the overall yield obtainable by this reaction. This recovering procedure may be repeated, if desired, to further increase the recovery of the starting material from the side products contained in the mother liquors. The proportion of zinc to mother liquor should be within the range of about 0.5:45 to 4:45 parts by weight, preferably about 0.9:45 to about 1.2:45. The proportion of carboxylic acid to the mother liquors should be within the range of about 0.5:9 to about 4:9, preferably about 0.8:9 to about 1.5:9, parts by weight.

As a positive halogen releasing agent there may be employed hypobromous acid, N,N-dichlorodimethyl hydantoin, N,N-dibromo-dimethyl hydantoin, and N-bromo and N-chloro derivatives of lower aliphatic carboxylic acid amides or imides such as N-bromoacetamide, N-chloroacetamide, N-bromosuccinimide, N-chlorosuccinimide, and the like.

The $\Delta^5$-steroid is reacted with a positive chlorine or bromine releasing agent in a hydrocarbon carboxylic acid reaction medium. As the carboxylic acid medium, there is preferably used a lower mono-carboxylic acid such as formic acid, acetic acid or mixtures thereof; however, other carboxylic acids containing less than 12 carbon atoms may be used such as propionic acid, butyric acid, pentanoic acid, benzoic acid, cyclopentylpropionic acid and the like. A mixture of carboxylic acids, e.g. formic acid and acetic acid, may also be employed. The carboxylic acid or a mixture of carboxylic acids is preferably anhydrous; however, substantially anhydrous, i.e. technical grade carboxylic acids may also be used. In the event that the available carboxylic acid desired to be used as the reaction medium contains water, the water may be removed before starting the reaction by adding an appropriate amount of a simple or mixed carboxylic acid anhydride, e.g. acetic anhydride, propionic anhydride, acetic butyric anhydride, and the like which will react with the water to form the corresponding acid or acids and thereby render the reaction medium anhydrous. Hence, this reaction may result in the formation of a mixture of 6β-esters of the starting material or a single 6β-ester. The expression "hydrocarbon carboxylic acid reaction medium" as used herein and in the appended claims is understood to include carboxylic acids and mixtures thereof rendered anhydrous by the addition of carboxylic acid anhydride.

The acid medium, if desired, may be diluted with an organic solvent, preferably an anhydrous organic solvent, which is a solvent for the steroid or acid or both and is inert to the reaction. Suitable organic solvents include the aromatic hydrocarbons such as benzene, toluene, xylene, and the like, chlorinated hydrocarbons such as methylene chloride, chloroform, chlorobenzene, or carbontetrachloride, mixtures of chlorinated hydrocarbons with alkanes such as pentane, hexane, heptane, e.g. a mixture of chloroform and hexane, ethers such as diethyl ether, dioxane, or tetrahydrofuran, and other well known organic solvents such as acetone, ethyl, acetate, dimethylsulfoxide, and the like. The amount of inert organic solvent, preferably anhydrous organic solvent, can vary considerably but preferably should not exceed more than about 60% by volume of the total reaction medium, more preferably not more than 30%.

If desired, a small amount of a strong acid may be included in the reaction mixture such as perchloric acid, sulfuric acid, and the like to catalyze the reaction. Generally, the acid catalyst should not exceed more than about 1% by volume of the total reaction mixture. The presence of a catalytic amount of a strong acid is not essential or required in view of the already acid reaction medium.

The concentration of the reaction mixture can be varied considerably. For practical or economical reasons it is preferred to use the smallest amount possible of carboxylic acid. Generally, the concentration of steroid should be within the range of about 2% to 50% by weight of the total reaction mixture, preferably 5% to 35%. The steroid starting material does not need to be dissolved in the carboxylic acid medium as a suspension of the steroid functions satisfactorily in this reaction.

The next, or second step of the process of the present invention is the conversion of the 5α-bromo- or 5α-chloro-6β-acyloxy steroid (II) into the epoxide, i.e. the 5β,6β-oxido steroid (III). This reaction is accomplished by treating the 5α-halo-6β-acyloxy steroid (II) with a base in the presence of a water miscible organic solvent. Suitable water miscible organic solvents include the lower alcohols, preferably a monohydric alcohol such as methanol or ethanol, ethers such as tetrahydrofuran, dioxane, and the like, dimethylsulfoxide, dimethylformamide, dimethylacetamide, and the like. The base may suitably be an alkali metal or alkaline earth metal hydroxide, carbonate, bicarbonate, or acetate, preferably an alkali metal base such as potassium or sodium hydroxide or the bicarbonate, carbonate, or acetate thereof. The amount of base employed in this reaction should be within the range of about 2 to 25 molar equivalents per mol of steroid, preferably within the range of about 2 to 20 molar equivalents. Larger amounts of base may be employed, if desired, but generally there is no advantage in doing so. The amount of steroid material present in the reaction mixture should be within the range of about 2% to about 50% by weight, preferably 20% by weight of the total reaction mixture. The reaction temperature may range from about room temperature to the reflux temperature of the solvent employed. This step provides an essentially quantitative yield of the desired 5β,6β-oxido compound (III).

In practicing the second step, when an ester group is present at position-3 (II; R=acyloxy), the ester group will be converted into a hydroxy group due to the base conditions of the reaction. The resulting 3β-hydroxy-5β,6β-oxido material may be employed in the next step of the process but preferably the hydroxy group is converted into an ester group before carrying out the next step. This conversion or esterification is carried out in a conventional manner by treating the 3β-hydroxy steroid with an acyl halide, preferably the chloride e.g. benzoylchloride or an anhydride of a hydrocarbon carboxylic acid containing less than 12 carbon atoms, e.g. acetic, propionic, butyric or caproic acid anhydride, or the like in the presence of pyridine, collidine, lutidine, or the like. Mixtures of the foregoing solvents may be used alone or together with one or more other inert organic solvents such as benzene, toluene, xylene, and the like. The acyl halide or carboxylic acid anhydride should be present in the amount of at least one molar equivalent per mol of the steroid, preferably a slight excess. Preferably, this reaction is carried out in pyridine using acetic anhydride. The reaction may be conducted at a temperature ranging from room temperature or lower to reflux temperature, and the reaction time may range from about 30 minutes to about 15 hours or longer. The concentration of steroid present in the reaction mixture may be varied considerably. Generally, a concentration of from 2% to 50% by weight is used, preferably about 20% by weight of the total reaction mixture.

The next step of the process of the present invention involves subjecting the 5β,6β-oxido steroid (III) to hydrobromination. This step is accomplished by treating the steroid with hydrogen bromide in an inert solvent medium to convert the epoxide into the desired 5α-bromo-6β-hydroxy steroid (IV). This reaction is carried out by dissolving the steroid in an organic solvent which is substantially inert to dry hydrogen bromide, and preferably a substantially nonpolar organic solvent or solvent mixture, e.g. an aromatic such as benzene, toluene or xylene, a chlorinated hydrocarbon such as methylene chloride, chloroform, carbontetrachloride, or chlorobenzene, mixtures of chlorinated hydrocarbons with alkanes such as pentane, hexane, or heptane, e.g. a mixture of chloroform and hexane, and ether such as diethyl ether, dioxane, or tetrahydrofuran, or the like, as well as mixtures of the foregoing solvents such as toluene and hexane, and then treating the solution with one molar equivalent or more of anhydrous hydrogen bromide. The hydrogen bromide can be added as a solution in one or more of the aforementioned solvents, or preferably, introduced into the reaction sphere or medium in gaseous form. A reaction temperature ranging from about −10° C. or lower to about 30° C., and preferably from about 15° C. to 25° C., is generally used, although higher and lower temperatures can also be employed, if desired, with the rate of reaction being affected correspondingly. The reaction should be continued until no further uptake or hydrogen bromide takes place. Conducting the reaction at a temperature of from about 15° C. to 25° C. and introducing the dry hydrogen bromide at a rate of about 0.1 to 1.0 liter per minute or more usually requires a reaction time of the order of 10 to 60 minutes for a batch of 100 grams of steroid. The concentration of steroid in the reaction mixture may satisfactorily be within the range of about 2% to about 50% by weight, preferably about 5% to 20% by weight of the total reaction mixture.

The foregoing hydrobromination reaction proceeds in excellent yield, that is, about 90 to 95% of the desired 5α-bromo-6β-hydroxy steroid (IV) which is easily recoverable by, e.g., filtration. The side products of this reaction which comprise primarily the corresponding 5β-hydroxy-6α-bromo steroid remain in solution and by treatment of the solution (mother liquors of the hydrobromination reaction) with a base, preferably a strong base such as sodium or potassium hydroxide, in the presence of a water-miscible organic solvent, e.g. methanol, ethanol and the like, the side products are converted back to the 5β,6β-oxido steroid (III) for recycling in the process. Preferably, the conversion of the side products is accomplished by concentrating the mother liquors obtained from the hydrobromination step, and adding water miscible organic solvent such as methanol and a strong base solution such as 50% sodium hydroxide solution to the concentrate and heating above room temperature for a period of time of the order of about 30 minutes to 15 hours or more. A temperature ranging from about room temperature to the reflux temperature of the solvent employed may be used. The amount of strong base employed in proportion to the mother liquor from the hydrobromination reaction should be within the range of about 0.5:150 to about 4:150 parts by weight, preferably about 1:150. The amount of weight miscible organic solvent may vary considerably. Generally, the amount of water miscible organic solvent used in proportion to the mother liquor resulting from the hydrobromination reaction, before said liquor is concentrated, should be within the range of about 0.5:20 to about 4:20, parts by weight.

Suitable starting materials for the present invention are the $\Delta^5$-steroids, i.e. a mono-unsaturated, non-conjugated steroid having ethylenic unsaturation between carbon-5 and carbon-6. The expression "$\Delta^5$-steroid" as used herein and in the appended claims includes for example, the acylates, preferably the acetates, of $\Delta^5$-steroids of the androstanes, pregnanes, sapogenins, alkaloids and cholestanes. Typical 3β-acyloxy-$\Delta^5$-steroids include, for example, 3β-acetoxyandrost-5-en-17-one, 3β,17β-dihydroxyandrost-5-en-3-acetate - 17 - benzoate, 3β,17β - diacetoxyandrost-5-ene, 3β-acetoxypregn-5-en - 20 - one, 3β - acetoxycholest-5-ene, the diacetate and dibenzoate of cholest-5-ene-3β,7α-diol and cholest-5-ene-3β,7β-diol, 3β-acetoxy-$\Delta^5$-bisnorcholenic acid, the acylate, preferably the acetate of campesterol, β-sitosterol, clionasterol, α-sitosterol, and acylates, preferably the acetate, of $\Delta^5$-sapogenins such as diosgenin, yamogenin, ruscogenin, botogenin and the like, and of $\Delta^5$-alkaloids such as solanidine, solasodine, rubijervine, isorubijervin, and the like. Other $\Delta^5$-steroids suitable as the starting material for the present invention include the 3-desoxy-$\Delta^5$, 3 - halo-$\Delta^5$ and 3 - hydroxy-$\Delta^5$-steroids such as 3-desoxyandrost-5-en-17-one, 3β-chloroandrost-5-en-17-one, 3β-hydroxyandrost-5-en-17 - one, 3-desoxypregn-5-en-20-one, and the like.

EXAMPLE 1

To 187 grams of formic acid (90%) there was added 113 grams of acetic anhydride while maintaining the temperature at about 55–65° C. for about 10 minutes. Thereafter, the mixture was cooled to about 20° C. and 100 grams of 3β-acetoxyandrost-5-en-17-one was added with stirring. 59 grams of N-bromosuccinimide were then added while maintaining the temperature at about 20–25° C. with an ice bath. The resulting mixture was then stirred for one hour while maintaining a temperature of 20–25° C. Thereafter, about 10 grams of sodium bisulfite in 50 ml. of water was added and the reaction mixture poured into about 850 ml. of water, stirred and filtered to yield a mixture of the 6β-acetate and 6β-formate of 5α - bromo - 3β,6β - dihydroxyandrostan - 17 - one - 3-acetate which were purified as follows. The crude mixed esters were washed with water and then dissolved in 700 ml. of methylene chloride. The aqueous layer was then separated and extracted with methylene chloride. The organic phases were then combined and concentrated at atmospheric pressure. The residue was taken up in 600 ml. of methanol and the solution distilled under vacuum until the volume was reduced to 400 ml. The resulting solution was cooled to about 15 to 20° C. and then filtered. The precipitate was then washed with 150 ml. of methanol yielding a pure mixture of the 6β-acetate and 6β-formate of 5α-bromo - 3β,6β - dihydroxyandrostan-17-one-3-acetate.

By repeating the foregoing procedure using N-chlorosuccinimide in place of N-bromosuccinimide, there was obtained the corresponding 5α-chloro compounds.

The mother liquors (combined filtrate and washings) obtained from the purification of the mixed esters of the above reaction, 5 g. of zinc powder, and 50 g. of acetic acid were heated to a temperature of about 85–90° C. Then, there was added another 5 g. of zinc powder and the reaction mixture heated on a steam bath (85–95° C.) for about one hour. Most of the remaining solvent was then evaporated and 100 ml. of benzene was added. The resulting mixture was then cooled, to about 20° C., and 100 g. of water were added. The mixture was then filtered and the recovered zinc was washed with about 50 ml. of benzene. The aqueous phase was then separated from the filtrate and discarded. The remaining organic phase was then washed with water, separated, and evaporated to a small volume. The small volume of concentrate was then taken up in 100 ml. of methanol and the resulting mixture evaporated to a small volume. The resulting concentrate was then dissolved in about 80 ml. of methanol. The resulting solution was then concentrated to saturation, cooled to about 20° C. and filtered. The resulting solid product was then washed with methanol to yield 3β-acetoxyandrost-5-en-17-one. A second crop of the foregoing $\Delta^5$-steroid was obtained by evaporating the mother liquors, cooling, filtering, and washing.

EXAMPLE 2

A mixture of 100 grams of 3β,17β-diacetoxyandrost-5-ene, 60 grams of N-bromosuccinimide, and 300 ml. of anhydrous acetic acid was held at room temperature (20–25° C.) with stirring for about 70 minutes. Thereafter, the reaction mixture was poured into one liter of water containing about 12 grams of sodium bisulfite and the resulting mixture filtered. The solid product was washed with water, dissolved in methylene chloride and the organic phase separated and concentrated to dryness to yield 5α - bromo - 3β,6β,17β - triacetoxyandrostane which may be further purified, if desired, as described in Example 1.

EXAMPLE 3

By repeating the procedure of Example 1 using 3β-acetoxy-17β-benzoxyandrost-5-ene, 3β-acetoxypregn - 5 - ene, 3β-acetoxypregn-5-en-20-one and 3β-acetoxycholest-5-ene as the starting material, there was obtained a mixture of the corresponding 5α-bromo-6β-formate and 6β-acetate of each of the foregoing Δ⁵-steroids.

EXAMPLE 4

To a mixture of 10 g. of 3β-acetoxyandrost-5-en-17-one and 10 ml. of 97% formic acid, there was added 6.24 g. of N-bromo-succinimide suspended in 20 ml. of methylene chloride. The resulting mixture was then stirred for about 1 hour and 50 minutes at 15–20° C. About 1 g. of sodium bisulfite in 50 ml. of water was added to the reaction mixture which was then extracted twice with methylene chloride. The organic extracts were then washed with water, dried and evaporated to dryness to yield 3β-acetoxy-5α-bromo-6β-formoxyandrostan-17-one.

EXAMPLE 5

To a solution consisting of 500 ml. of methanol and the mixed esters (6β-formate and 6β-acetate of 5α-bromo-3β,6β-dihydroxyandrostan-17-one 3-acetate) obtained in Example 1 there was added 100 grams of aqueous sodium hydroxide solution (50%) while maintaining the temperature at about 35 to 45° C. The resulting mixture was then held at 35–45° C. for about 30 minutes. The reaction mixture was then neutralized by the addition of dilute aqueous acetic acid and distilled until the internal temperature was 90° C. whereupon 300 ml. of toluene were added. The mixture was then stirred and refluxed until no undissolved solids remained and the organic and aqueous layers separated. The organic layer which contains 3β - hydroxy-5β,6β-oxidoandrostan-17-one was then concentrated to about 250 to 300 ml. and 50 grams of pyridine and 75 grams of acetic anhydride were added. The temperature was maintained at 85 to 95° C. for one hour and then 600 ml. of toluene were added and the mixture cooled to about 20° C. The mixture was then washed with water, dilute aqueous acetic acid (50 ml. of acetic acid:350 ml. of water) and water to remove the pyridine and then the organic phase concentrated to a total volume of about 700 ml. To this solution which contains 3β-acetoxy-5β,6β-oxidoandrostan-17-one there was added 100 ml. of toluene and 500 ml. of hexane and the resulting mixture cooled to 15 to 18° C. While maintaining the temperature between 15 to 18° C., about 21.5 grams of dry hydrogen bromide was slowly introduced over the solution while stirring until a slight excess was present. The addition of hydrogen bromide takes about 45 to 60 minutes. The reaction mixture was then filtered and the solid product washed with a mixture of 100 ml. of toluene and 100 ml. of hexane and then twice with 200 ml. portions of hexane and the product dried at about 25° C. Thus, there was obtained 3β-acetoxy - 5α - bromo-6β-hydroxyandrostan-17-one.

The mother liquor (filtrate and washings from final product) was then washed with 100 grams of water containing 5 grams of sodium bicarbonate and the aqueous phase separated and discarded. The organic phase was then evaporated to a small volume. About 60 ml. of methanol was then added to the concentrate and then 12 grams of sodium hydroxide solution (50% w./w.) was added with stirring while maintaining the temperature at 35–45° C. This temperature was maintained for about 30 minutes. The reaction mixture was then cooled and neutralized by the addition of aqueous acetic acid. To the neutralized mixture there was then added toluene and the aqueous phase was then separated and discarded. The organic phase was washed, dried and evaporated to yield 3β-hydroxy - 5β,6β - oxidoandrostan-17-one which can be converted into the corresponding 3-acetate by treatment with acetic anhydride in pyridine in the manner described hereinabove.

EXAMPLE 6

A mixture of 1 g. of 3-desoxyandrost-5-en-17-one, 2 molar equivalents of N-bromosuccinimide and 50 ml. of anhydrous acetic acid was stirred for 1.3 hours while maintaining a temperature of about 20° C. Thereafter, 15 ml. of water containing 1 g. of sodium bisulfite was added and the reaction mixture was then emptied into 150 ml. of water and stirred. The precipitate was recovered by filtration, washed with water and dried to yield 3-desoxy-5α-bromo-6β-acetoxyandrostan-17-one.

A mixture of the above-prepared 5α-bromo-6β-acetoxy compound, 50 ml. of methanol, and 10 g. of aqueous potassium hydroxide solution (50%) was held at a temperature of about 35° C. for 35 minutes. The reaction mixture was then neutralized by the addition of dilute aqueous acetic acid. The resulting mixture was then poured into 100 ml. of water, and the organic precipitate was filtered, washed and dried to yield 3-desoxy-5β,6β-oxidoandrostan-17-one.

The thus-obtained epoxide was dissolved in 15 ml. of toluene and the solution cooled to about 15–18° C.; while maintaining this temperature, 1.5 molar equivalents of dry hydrogen bromide was slowly introduced over the solution with stirring until a slight excess was present. The reaction mixture was then filtered and the collected solid product washed with a mixture of toluene and hexane (1:1) and then hexane and the product dried under vacuum. Thus, there was obtained 3-desoxy-5α-bromo-6β-hydroxyandrostan-17-one.

EXAMPLE 7

To a mixture of 1 g. of 3β-acetoxyandrost-5-en-17-one and 15 ml. of anhydrous acetic acid, there was added 1.2 molar equivalents of N-chloroacetamide. The resulting mixture was then stirred for about two hours at 20° C. The reaction mixture was thereafter poured into 50 ml. of water and the resulting mixture extracted with methylene chloride. The methylene chloride extracts were then washed with water, dried and evaporated to dryness to yield 3β,6β-diacetoxy-5α-chloroandrostan-17-one.

What is claimed is:

1. A process for the preparation of a 5α-halo-6β-acyloxy steroid which comprises reacting a Δ⁵-steroid of the androstane, pregnane, sapogenin, alkaloid or cholestane series with from 1 to about 10 molar equivalents of a positive halogen releasing agent selected from the group consisting of N-bromoacetamide, N-chloroacetamide, N-bromosuccinimide, N-chlorosuccinimide, N,N-dibromodimethylhydantoin and N,N-dichlorodimethylhydantoin, in a substantially anhydrous hydrocarbon carboxylic acid reaction medium, said acid containing less than 12 carbon atoms.

2. The process according to claim 1 wherein said acid reaction medium is selected from the group consisting of formic acid, acetic acid and mixtures of formic acid and acetic acid.

3. The process according to claim 1 wherein said acid reaction medium is an anhydrous carboxylic acid reaction medium selected from the group consisting of formic acid, acetic acid and mixtures of formic acid and acetic acid.

4. The process according to claim 3 wherein said acid reaction medium is acetic acid.

5. The process according to claim 3 where said acid reaction medium is a mixture of a major amount of formic acid and a minor amount of acetic acid.

6. The process according to claim 3 wherein said reaction medium is diluted, up to 60% by volume of the total reaction medium, with an organic solvent inert to the reaction.

7. The process according to claim 6 wherein said organic solvent is an anhydrous organic solvent.

8. The process according to claim 3 wherein said Δ⁵-steroid is 3β-acetoxyandrost-5-en-17-one.

9. The process according to claim 3 wherein said Δ⁵-steroid is 3β-acetoxypregn-5-en-20-one.

10. The process according to claim 3 wherein said Δ⁵-steriod is 3β-acetoxycholest-5-ene.

11. The process according to claim 3 wherein said Δ⁵-steroid is 3β-acetoxyspirost-5-ene.

12. The process according to claim 3 wherein said positive halogen releasing agent is present in the amount of from 1 to about 10 molar equivalents per mole of said Δ⁵-steroid, said Δ⁵-steroid is present in the amount of about 2% to about 50% by weight of the total reaction mixture, and said reaction is conducted at a temperature within the range of about 10° C. to about 40° C. for a period of time of about 15 minutes to about 120 minutes.

13. The process according to claim 12 wherein said positive halogen releasing agent is present in the amount of from about 1 to about 3 molar equivalents per mole of said Δ⁵-steroid and said reaction is conducted at about room temperature for about 60 minutes to about 120 minutes.

14. The process according to claim 13 wherein said Δ⁵-steroid is 3β-acetoxyandrost-5-en-17-one.

15. In a process for the preparation of a 5α-halo-6β-acyloxy steroid which comprises reacting a Δ⁵-steroid of the androstane, pregnane, sapogenin, alkaloid or cholestane series with from 1 to about 10 molar equivalents of a positive halogen releasing agent selected from the group consisting of N-bromoacetamide, N-chloroacetamide, N-bromosuccinimide, N-chlorosuccinimide, N,N-dibromodimethylhydantoin and N,N-dichlorodimethylhydantoin, in a substantially anhydrous hydrocarbon carboxylic acid reaction medium selected from the group consisting of formic acid, acetic acid and mixtures of formic acid and acetic acid, the improvement which comprises treating the mother liquor obtained from said process with zinc in the presence of a lower hydrocarbon carboxylic acid to regenerate said Δ⁵-steroid.

16. A process for the preparation of a 5α-halo-6β-hydroxy steriod which comprises reacting a Δ⁵-steroid of the androstane, pregnane, sapogenin, alkaloid or cholestane series with from 1 to about 10 molar equivalents of a positive halogen releasing agent selected from the group consisting of N-bromoacetamide, N-chloroacetamide, N-bromosuccinimide, N-chlorosuccinimide, N,N-dibromodimethylhydantoin and N,N-dichlorodimethylhydantoin, in a substantially anhydrous hydrocarbon carboxylic acid reaction medium selected from the group consisting of formic acid, acetic acid and mixtures of formic acid and acetic acid, to obtain the corresponding 5α-halo-6β-acyloxy steroid reacting said 5α-halo-6β-acyloxy steroid with a base in a water-miscible organic solvent medium to obtain the 5β,6β-oxido derivative of said 5α-halo-6β-acyloxy steriod; and hydrobrominating said 5β,6β-oxido derivative by treatment with dry hydrogen bromide in an inert organic solvent medium to obtain said 5α-bromo-6β-hydroxy steroid.

17. The process according to claim 16 wherein said acid reaction medium is anhydrous, said base is selected from the group consisting of the hydroxide, carbonate, bicarbonate and acetate of sodium and potassium and said water miscible organic solvent is a lower monohydric alcohol.

18. The process according to claim 17 wherein said 5α-bromo-6β-hydroxy steroid resulting from said hydrobromination is separated from said inert organic solvent medium and the thus obtained mother liquor is concentrated to a small volume and treated with a strong base in the presence of a lower monohydric alcohol to regenerate said 5β,6β-oxido derivative.

19. A process for the preparation of a 5α-halo-6β-hydroxy steroid which comprises reacting a 3β-acyloxy-Δ⁵-steroid of the androstane, pregnane, sapogenin, alkaloid, or cholestane series with from 1 to about 10 molar equivalents of a positive halogen releasing agent selected from the group consisting of N-bromoacetamide, N-chloroacetamide, N-bromosuccinimide, N-chlorosuccinimide, N,N-dibromodimethylhydantoin and N,N-dichlorodimethylhydantoin, in a substantially anhydrous hydrocarbon carboxylic acid reaction medium selected from the group consisting of formic acid, acetic acid and mixtures of formic acid and acetic acid, to obtain the corresponding 5α-halo-6β-acyloxy steroid; reacting said 5α-halo-6β-acyloxy steroid with a base in a water-miscible organic solvent medium to obtain the corresponding 3β-hydroxy-5β,6β-oxido steroid; esterifying said 3β-hydroxy steroid to obtain the corresponding 3β-acyloxy-5β,6β-oxido steroid, and hydrobromiating said 3β-acyloxy steroid by treatment with dry hydrogen bromide in an inert organic solvent medium to obtain said 5α-halo-6β-hydroxy steroid.

20. The process according to claim 19 wherein said Δ⁵-steroid is a 3β-acetoxy-Δ⁵-steroid, said carboxylic acid reaction medium is anhydrous, said base is selected from the group consisting of the hydroxide, carbonate, bicarbonate and acetate of sodium and potassium, and said esterification is accomplished by the use of acetic anhydride in pyridine.

References Cited

UNITED STATES PATENTS 3,278,528   10/1966   Bowers et al. ----- 260—239.55
3,138,589   6/1964    Ringold et al.

ELBERT L. ROBERTS, *Primary Examiner.*

U.S. Cl. X.R.

260—239.5, 397.1, 397.2, 397.4, 397.5.